(12) United States Patent
Agarwal (10) Patent No.: US 9,064,134 B1
(45) Date of Patent: Jun. 23, 2015

(54) METHOD AND APPARATUS FOR MITIGATING SOFTWARE VULNERABILITIES

(75) Inventor: Manish Agarwal, Delhi (IN)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 488 days.

(21) Appl. No.: 12/961,026

(22) Filed: Dec. 6, 2010

(51) Int. Cl.
*G06F 21/70* (2013.01)
*G06F 21/88* (2013.01)

(52) U.S. Cl.
CPC ...................................... *G06F 21/70* (2013.01)

(58) Field of Classification Search
CPC ....... G06F 21/55; G06F 21/577; G06F 21/00; G06F 21/56
USPC ................. 717/122, 170, 172, 174, 176, 177; 726/25; 714/763–773
See application file for complete search history.

(56) References Cited

U.S. PATENT DOCUMENTS

| | | | | |
|---|---|---|---|---|
| 4,734,854 A | * | 3/1988 | Afshar | 717/107 |
| 5,613,101 A | * | 3/1997 | Lillich | 709/230 |
| 6,560,776 B1 | * | 5/2003 | Breggin et al. | 717/176 |
| 7,865,388 B2 | * | 1/2011 | Brumbaugh et al. | 705/7.13 |
| 2002/0157089 A1 | * | 10/2002 | Patel et al. | 717/178 |
| 2007/0016948 A1 | * | 1/2007 | Dubrovsky et al. | 726/22 |
| 2008/0209566 A1 | * | 8/2008 | Ziv | 726/25 |
| 2010/0257610 A1 | * | 10/2010 | Hohl | 726/25 |

OTHER PUBLICATIONS

"DL Surrogates", Microsoft, 1 page, downloaded on Mar. 10, 2011 from http://msdn.microsoft.com/en-us/library/ms695225%28VS.85%29.aspx.
"Using the System-Supplied Surrogate", Microsoft, 1 page downloaded on Mar. 10, 2011 from http://msdn.microsoft.com/en-us/library/ms684044(v=vs.85).aspx.
"Security Through Obscurity", From Wikipedia, 6 pages, downloaded on Mar. 10, 2011 from http://en.wikipedia.org/wiki/Security_through_obscurity.

* cited by examiner

*Primary Examiner* — Chat Do
*Assistant Examiner* — Sergio J Curbelo, III
(74) *Attorney, Agent, or Firm* — Keller Jolley Preece (57) ABSTRACT

A method and apparatus for mitigating software vulnerabilities is disclosed. In some embodiments, information associated with software application installation is processed. The information comprises mappings between each component and a currently installed component version. In response to information identifying at least one compromised component version for at least one software application, an alternate component version for each compromised component version is selected and used to install the at least one software application.

25 Claims, 8 Drawing Sheets

METHOD AND APPARATUS FOR MITIGATING SOFTWARE VULNERABILITIES

BACKGROUND

1. Technical Field

Embodiments of the present application generally relate to a computer security system and, more importantly, to a method and apparatus for mitigating software vulnerabilities.

2. Description of the Related Art

People use software programs (e.g., processor-executable instructions) to perform various computer tasks. For example, individuals and organizations create content (e.g., documents, multimedia data and/or the like) for publication in selected data sources (e.g., news sources, scientific paper databases, Internet websites and/or the like). These documents are also distributed by owners to one or more recipients for various purposes. For example, people create documents in a Portable Document Format (PDF) file. PDF is an open standard for document exchange created by Adobe Systems of San Jose, Calif.

As another example, people use various software programs to create and distribute multimedia data (e.g., video and/or audio data). Some software programs are components of an enterprise software application. For example, conventional video authoring software (i.e., ADOBE® PREMIERE® ELEMENTS where PREMIERE is a registered trademark of Adobe Systems Incorporated of San Jose, Calif.) employs various plug-ins to produce and/or edit the multimedia data. Rich Internet Applications (RIAs) provide interactive functionality for the multimedia data. Consequently, RIAs have become a very popular multimedia presentation tool on websites throughout the Internet.

An RIA typically is a collection of multimedia data that is wrapped within programming code to be executed by a playback routine. For example, some RIAs may comprise animations, interfaces, games, video clips, audio clips, and/or other interactive or passive content (referred to herein as "rich Internet content"). In addition, an RIA typically includes software code to instruct a playback routine (referred to as an "RIA Player") how to display and progress through the content of the RIA. One such RIA Player is a FLASH® player (FLASH is a registered trademark of Adobe Systems Incorporated) that executes an RIA in the form of a SWF file to present rich Internet content to a viewer. The SWF file format is defined in by the SWF File Format specification (version 10) as published, at http:www.adobe.com/devnet/swf/pdf/swf_file_format_spec_v10.pdf, by Adobe Systems Incorporated of San Jose, Calif.

When a software provider receives information that a software application has been compromised, a source of such information as well as the cause of such a compromise may be from any part of the world. The software provider has no option but to release a new patch for world-wide distribution. This diminishes potential and/or actual market reputation. If, however, the software program is compromised only in certain geographic regions of the world (i.e. only a certain percentage of software users are affected), then customer feedback is less negative. Because the world-wide patches are released sometime after the vulnerability is discovered, an instant solution is not available.

One of the causes of such software vulnerabilities is the use of a defective API (Application programming Interface). By calling and executing compromised software code, each plug-in has a same vulnerability on every computer. A plug-in is a set of software programs that adds or extends specific capabilities to a larger software application. A plug-in may include one or more files, such as DLL (Dynamic Link Library) files. If supported, plug-ins enable customization of existing application functionality. For example, plug-ins are commonly used in web browsers to play video, scan for viruses, and display new file types. For example, ADOBE® plug-ins add the capability of executing and/or displaying new file types inside a web browser, such as a Firefox web browser.

Therefore, there is a need in the art for method and apparatus for mitigating software vulnerabilities.

SUMMARY

Various embodiments of the present disclosure generally include a method and apparatus for mitigating software vulnerabilities. In some embodiments, information associated with software application installation is processed. The information comprises mappings between each component and a currently installed component version. In response to information identifying at least one compromised component version for at least one software application, an alternate component version for each compromised component version is selected and used to install the at least one software application.

Some embodiments of the present disclosure also include a method of distributing a plurality of component versions to mitigate software vulnerabilities. In some embodiments, a plurality of component versions is generated for each component of a software application. In some embodiments, the plurality of component versions is communicated to a plurality of client computerized devices, wherein at least one alternate component version replaces at least one compromised component version on at least one of the plurality of client computerized devices.

While the method and apparatus for mitigating software vulnerabilities is described herein by way of example for several embodiments and illustrative drawings, those skilled in the art will recognize that the method and apparatus for mitigating software vulnerabilities is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for partial encryption of frame-based electronic content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for mitigating software vulnerabilities are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
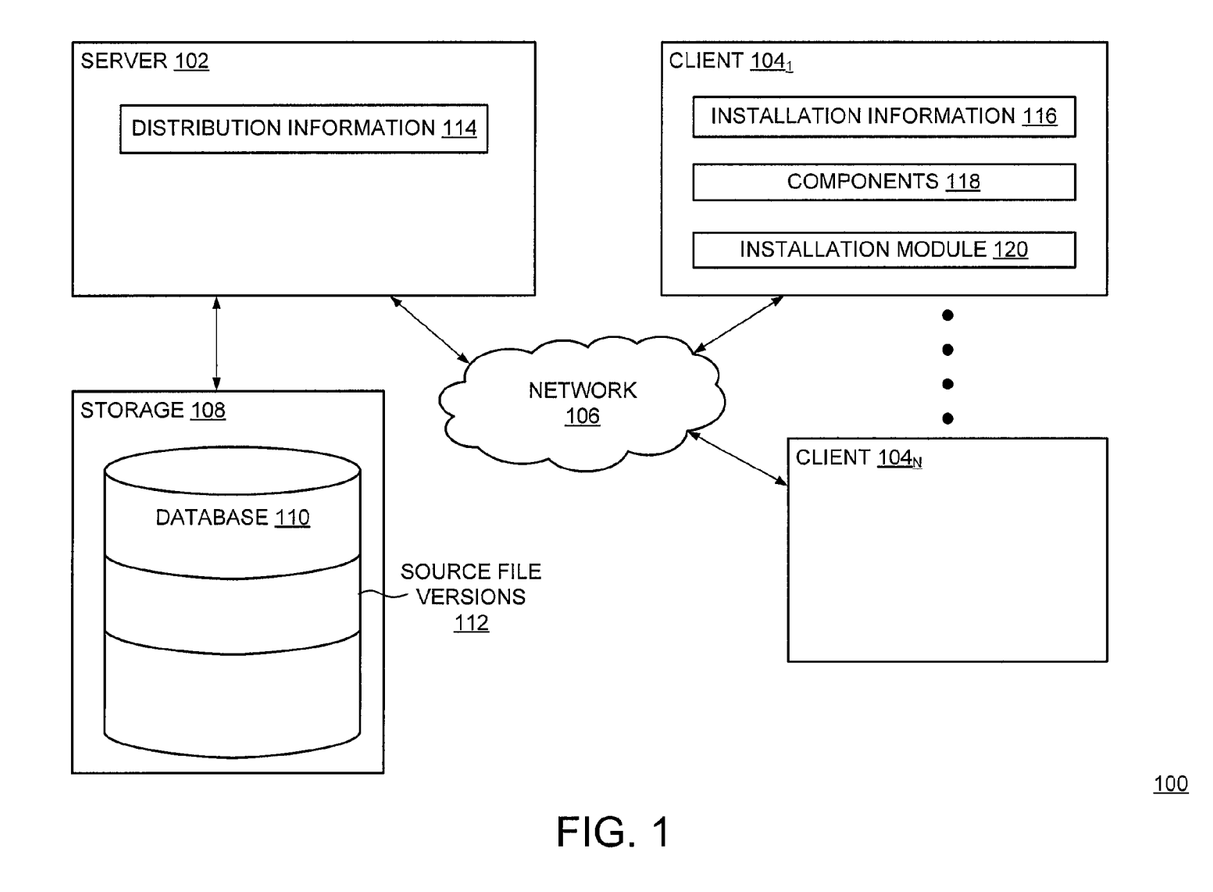
FIG. 1 is a block diagram of a system for mitigating software vulnerabilities according to various embodiments.

FIG. 1 is a block diagram of a system 100 for mitigating software vulnerabilities according to various embodiments. The server 102 communicates with a plurality of clients 104 through a network 106. In addition, the server 102 is coupled with storage 108.

The server 102 is a type of computerized device (e.g., a laptop, a desktop, a Personal Digital Assistant (PDA), a tablet, a smart phone (e.g., APPLE® iPhone), other data processing and display systems or devices and/or the like) known to one of ordinary skill in the art having the benefit of this disclosure. Details of a computing device that can function as the server 102 is described with respect to FIG. 7. The server 102 includes distribution information 114 associated with a database 110 having a plurality of source file versions 112. The server 102 creates different source files for each component 118 of a software application according to some embodiments. Each of the plurality of components 118 includes a compiled version of a software program for performing one or more functions on behalf of the software application.

Each of these source file versions 112 uses different logic to process and handle data. As an option, the server 102 can also encrypt each source file version 112 using different encryption algorithms, such as MD5 or RSA. Alternatively, the source file version 112 may be encrypted using modified versions of each of these algorithms. The distribution information 114 includes mappings between the source file versions 112 and the plurality of components 118 indicating which one of source file versions 112 to compile and use to install a certain component 118 at a particular client 104. In some embodiments, the distribution information 114 indicates in which geographic regions are computers using a particular source file version 112 for the certain component 118.

Each of the plurality of clients 104 is a type of computerized device (e.g., a laptop, a desktop, a Personal Digital Assistant (PDA), a tablet, a smart phone (e.g., APPLE® iPhone), other data processing and display systems or devices and/or the like) known to one of ordinary skill in the art having the benefit of this disclosure. The client $104_1$ illustrates a typical client computer that includes installation information 116, a plurality of components 118 and installation module 120. As explained further below, each of the plurality of components 118 may include software code that add functionality to or extend capabilities of existing software applications The plurality of components 118 may include plug-ins (e.g., DLL files) that may be integrated (i.e., installed) into an existing software application at one of the plurality of clients 104. A Dynamic Link Library (DLL) file includes software code forming functions that are called from other executable code, such as the existing software application or another DLL file. Hence, the software code is reusable and applicable for completing distinct tasks. The DLL file may be plugged into the existing software application whenever a specific feature is required instead of containing another copy of the same software code. Exemplary plug-ins implemented as DLLs include ActiveX controls (e.g., a calendar control that lets you select a date from a calendar), Control Panel components (e.g., a .cpl file that operates an item that is located in Control Panel) as well as device drivers (e.g., .a printer driver that controls printing operations. The plurality of components 118 may also include snap-ins, themes, extensions (e.g., ZIP files, JAR files and/or the like), and/or any other form of add-on.

As explained further below, each of the plurality of components 118 corresponds with various versions that perform the same functionality but employ different programming logic to prevent vulnerability exploitation. The installation information 116 includes mappings between component versions and the plurality of components 118 indicating which one of component versions to install. As explained in detail further below for FIG. 2, the installation module 120 uses these mappings to initiate and perform an installation process for a software application (e.g., ADOBE® Acrobat, ADOBE® Flash Player and/or the like).

The network 106 comprises a communication system that connects computing devices by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet or intranet using various communications infrastructure such as Ethernet, WiFi, WiMax, General Packet Radio Service (GPRS), and the like.

The storage 108 generally includes various hardware and/or software that are configured to manage storage resources within the system 100. The storage 106 includes a device having one or more data storage drives (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) for one or more computing devices, such as the server 102. In one embodiment, the storage 108 includes a system for maintaining and storing various data, such as the plurality of source file versions 112, within the database 110.

Figure 2:
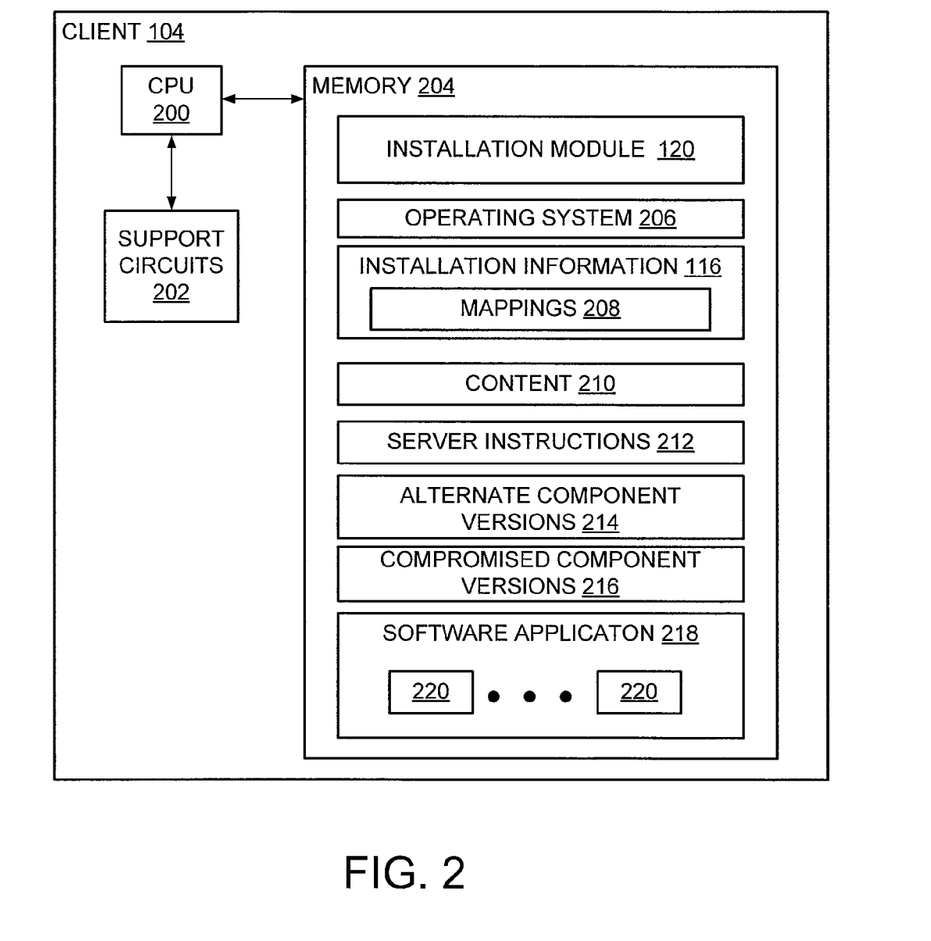
FIG. 2 is a block diagram of a client computerized device for mitigating software vulnerabilities according to various embodiments.

FIG. 2 is a block diagram of the client 104 for mitigating software vulnerabilities according to various embodiments. The client 104 comprises a Central Processing Unit (CPU) 200, various support circuits 202 and a memory 204. The CPU 200 may comprise one or more commercially available microprocessors or microcontrollers that facilitate data processing and storage. Various support circuits 202 facilitate operation of the CPU 200 and may include clock circuits, buses, power supplies, input/output circuits and/or the like. The memory 204 includes a read only memory, random access memory, disk drive storage, optical storage, removable storage, and the like. The memory 204 includes various software packages, such as the installation module 120, an operating system 206 and a compiler 208 as well as various data, such as the installation information 116, content 210 and server instructions 212. The memory 204 also includes various compiled versions of with a plurality of components 220 to form a software application 218 (e.g., ADOBE® Acrobat Reader, an ADOBE® Flash Player, an AIR (ADOBE® Integrated Runtime) application and/or the like). Specifically, the memory 204 includes alternate component versions 214 for replacing compromised component versions 216 during utilization (e.g., installation) of the software application 218.

The installation information 116 includes mappings 220 between each component 220 of a software application 218 and which version of the component 220 is currently installed. For example, a developer may create five or more versions of a DLL file. The DLL file version currently installed at the client computer 104 is identified in the mappings 220 through a version identifier (e.g., a version number). If the currently installed DLL file version becomes compromised via software vulnerability exploitation, the installation module 120 selects another version identifier and loads one of the alternate component versions 214 associated with the other version identifier. Then, the installation module 120 records the other version identifier in the mappings 220. Although one embodiment of the installation module 120 may be implemented in software, other embodiments may be implemented in hardware or as firmware.

Users of the client 104 generate the content 210 using various software programs, such as a video authoring tool or a word processing tool. In some embodiments, the content 210 includes confidential information that is organized and/or presented through a document, such as a Portable Document Format (PDF) file, or multimedia data, such as FLASH video. The confidential information may include financial statements, medical records, intellectual property and/or the like that are stored as PDF files. Software vulnerabilities within the various software programs results in the content 210 being endangered. When a certain software program is compromised, the content 210 is exposed to certain perils, such as fraud, unwanted disclosure and/or theft. For example, the content 210 may include an important legal document and if the word processing tool is compromised, the legal document may be altered or deleted.

The operating system 206 generally manages various computer resources (e.g., network resources, data storage resources, file system resources and/or the like). The operating system 206 is configured to execute operations on one or more hardware and/or software devices, such as Network Interface Cards (NICs), hard disks, virtualization layers, firewalls and/or the like. For example, the various software packages call commands associated with the operating system 206 (i.e., native operating system commands) to perform various file system and/or storage operations, such as creating files or metadata, writing data to the files, reading data from the files, modifying metadata associated with the files and/or the like. The operating system 206 may call one or more functions associated with device drivers to execute various file system and/or storage operations.

Figure 3:
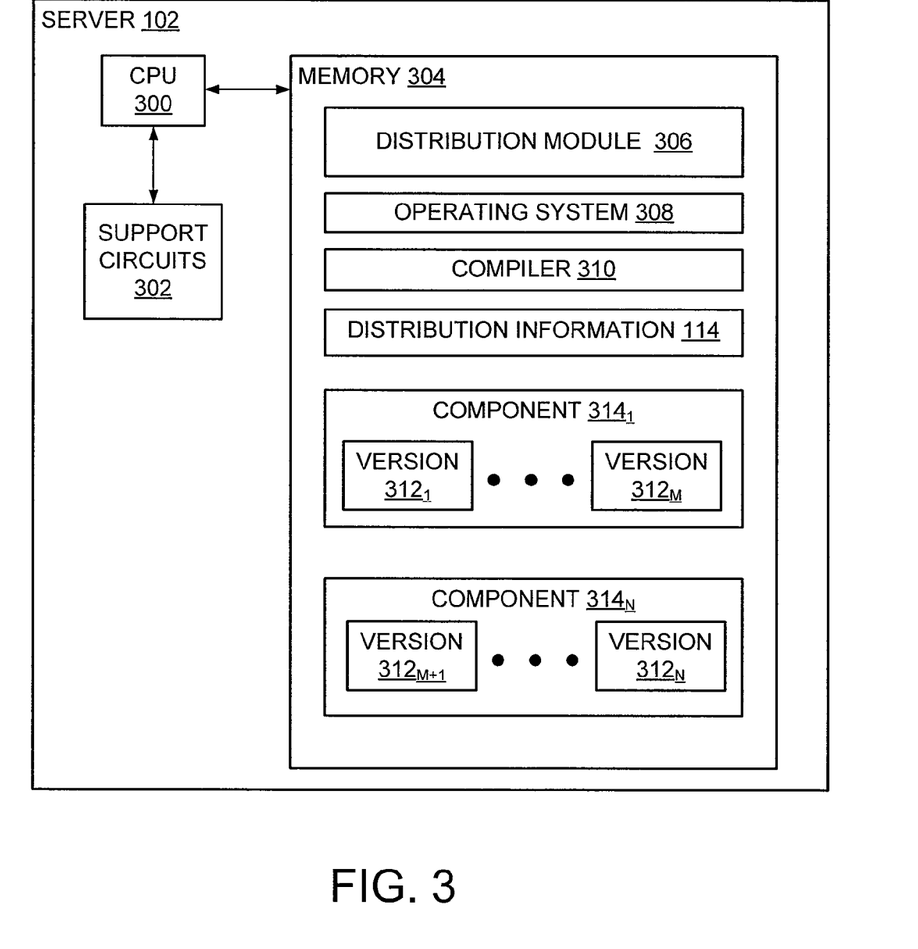
FIG. 3 is a block diagram of a server for distributing a plurality of component versions to mitigate software vulnerabilities according to various embodiments.

FIG. 3 is a block diagram of the server 102 for mitigating software vulnerabilities according to various embodiments. The client 104 comprises a Central Processing Unit (CPU) 300, various support circuits 302 and a memory 304. The CPU 300 may comprise one or more commercially available microprocessors or microcontrollers that facilitate data processing and storage. Various support circuits 302 facilitate operation of the CPU 300 and may include clock circuits, buses, power supplies, input/output circuits and/or the like. The memory 304 includes a read only memory, random access memory, disk drive storage, optical storage, removable storage, and the like. The memory 304 includes various software packages, such as distribution module 306, an operating system 308 and a compiler 310 as well as various data, such as the distribution information 114.

The memory 304 also includes several versions 312 of various components 314 (illustrated as the component $314_1$ to the component $314_N$) of a particular software application. Specifically, the memory 304 includes alternate versions 312 (illustrated as the version $312_1$ to the version $312_N$) for each component 314. These versions 312, generally, include compiled object code for different source files for the same component 314. In some embodiments, the versions 312 are DLL files that provide the same functionality and are distributed to different client computers as explained further below.

The compiler 310 generally includes a special software program that processes statements written in a particular programming language and turns them into machine language or "code", (e.g., processor executable instructions) that the CPU 300 uses. Typically, a programmer writes statements in a language, such as Pascal or C, which are later stored in a source file. The programmer then runs the appropriate language compiler 310, specifying the name of the source file. When executing (running), the compiler 310 first parses (or analyzes) all of the language statements syntactically one after the other and then, in one or more successive stages or "passes", builds the software code, making sure that statements that refer to other statements are referred to correctly in the final version of the code.

In some embodiments, the distribution module 306 includes software code for producing the functionally-similar versions 312 of a particular one of the components 314. Although one embodiment of the distribution module 306 may be implemented in software, other embodiments may be implemented in hardware or as firmware. These versions 312 include variations in programming logic, which prevent software vulnerability exploitation by hacking devices and applications. If one of the versions 312 becomes compromised, an alternate one of the versions 312 corresponding to a same one of the components 314 can replace the compromised one of the versions 312. Accordingly, unauthorized use of software applications via a software vulnerability is limited to client computers (e.g., the client computer 102 of FIG. 1) that use the compromised version 312.

In some embodiments, these client computers can be confined to a geographic region (e.g., Europe). The distribution module 306 may transmit a certain one of the versions 312 to only client computers in that geographic region. For example, these client computers may use one version of a plug-in or DLL file (e.g., a Dynamic Link Library file) during the installation and operation of a software application (e.g., ADOBE FLASH Player, Acrobat and/or the like). If this plug-in became compromised due to software vulnerability exploitation, an alternate version of the plug-in is loaded and utilized to automatically resolve the software vulnerability and continue normal use of the software application. Replacing the compromised plug-in version with the non-compromised plug-in version provides a robust software application that restricts functionality problems caused by software vulnerabilities to one or more specific geographic region.

In other embodiments, the distribution module 306 copies the versions 312 to any client computer without regard to location. In these embodiments, the client computers having the compromised one of the versions 312 are randomly distributed. Along the same lines as distributing the versions 312 by location, a random distribution process limits, to a certain portion of all client computers world-wide, functionality problems associated with the software applications that are caused by software vulnerabilities.

Figure 4:
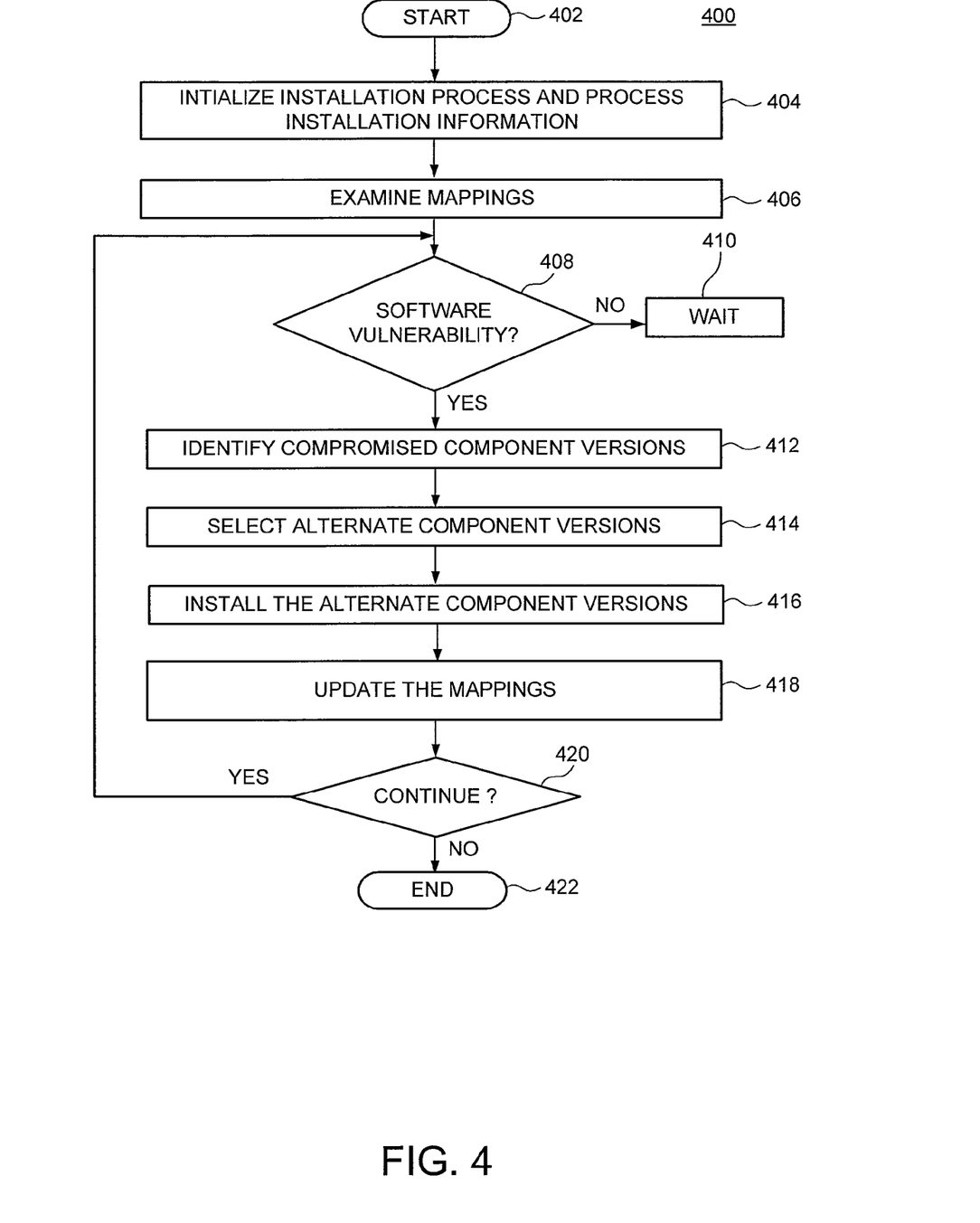
FIG. 4 is a flow diagram of a method for mitigating software vulnerabilities according to various embodiments.

FIG. 4 is a flow diagram of a method 400 for mitigating software vulnerabilities according to various embodiments. In some embodiments, installation module (e.g., the installation module 120 of FIG. 1) performs each and every step of the method 400. In other embodiments, some steps are omitted or skipped. The method 400 starts at step 402 and proceeds to step 404.

In some embodiments, the method 400 is executed while installing of a software application (e.g., the software application 218 of the FIG. 2). During such an installation, a server (e.g., the server 102 of FIGS. 1 and 3) may communicate information (i.e., instructions) identifying a compromised component version to be replaced. In some embodiments, such information may also indicate a version number associated with an alternate component version to load and install. In other embodiments, a client computer (e.g., the client computer 104 of FIGS. 1 and 2) is permitted to select the alternate component version to replace the compromised component version.

At step 404, the method 400 initializes an installation process and processes installation information (e.g., the installation information 116 at FIG. 1). At step 406, the method 400 examines mappings between each component and a component version that is currently installed. Such mappings (e.g., the mappings 220 of FIG. 2) are extracted from the installation information. At step 408, the method 400 determines whether any of the components are vulnerable to manipulation by hackers. If the method 400 determines that none of the components are vulnerable, the method 400 proceeds to step 410. At step 410, the method 400 waits until a type of software vulnerability is detected. If, on the other hand, the method 400 identifies an installed component that is vulnerable to attacks, the method 400 proceeds to step 412. For example, the server may communicate information identifying the compromised component version.

At step 412, the method 400 identifies one or more compromised component versions. Each compromised component versions (e.g., the compromised component versions 216 of FIG. 2) have the identified software vulnerability and cause the software application (e.g., the software application 218 of FIG. 2) to malfunction or operate maliciously. At step 414, the method 400 selects one or more alternate component versions to replace the one or more compromised component versions. These steps are further explained in the description of FIG. 5. At step 416, the method 400 installs one or more components that correspond with the alternate component versions. At step 418, the method 400 updates the mappings. At step 420, the method 400 determines whether to continue and wait for another software vulnerability to be detected. If the method 400 decides to continue, the method 400 returns to step 408. If, on the other hand, the method 400 decides not to continue, the method 400 proceeds to step 422. At step 422, the method 400 ends.

Figure 5:
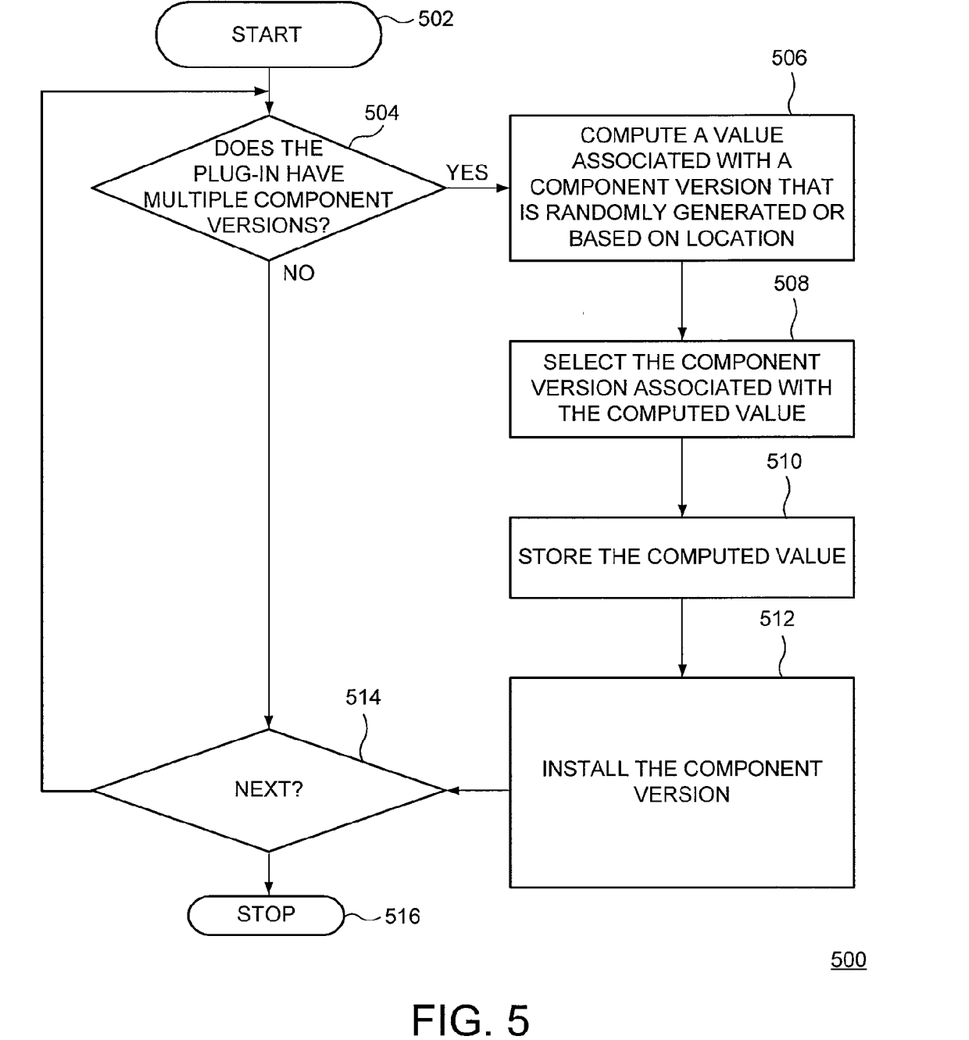
FIG. 5 is a flow diagram of a method for installing a plurality of components using mappings between each component and one or more component versions according to various embodiments.

FIG. 5 is a flow diagram of a method 500 for installing a plurality of components using mappings associated with each plug-in of a software application according to various embodiments. Each plug-in may include one or more DLL files that correspond with one or more plug-in (i.e., component) versions. In some embodiments, installation module (e.g., the installation module 120 of FIG. 1) performs each and every step of the method 500. In other embodiments, some steps are omitted or skipped. The method 500 starts plug-in installation at step 502 and proceeds to step 504.

At step 504, the method 500 determines whether the plug-in has multiple versions. If the method 500 determines that the plug-in has multiple component versions, the method 500 proceeds to step 506. If, however, the method 500 determines that the plug-in does not have multiple versions, the method 500 proceeds to step 516. In some embodiments, the method 500 examines installation information (e.g., the installation information 116 of FIG. 1) to extract the mappings between component versions and a plurality of components. The client computer maintains the installation information as an encrypted file hidden from the user, which saves these mappings in a bit format to indicate which component is installed for each plug-in according to some embodiments. The installation information may include plug-in components details which are installed written on it with a component number to the right according to some embodiments.

At step 506, the method 500 computes a value (i.e., an identifier) for selecting a plug-in version. In some embodiments, the computed value is a random number denoting a specific plug-in version to install. In other embodiments, the computed value is based on a geographic region of the client. At step 508, the method 500 selects a plug-in version to install based on the computed value. Alternatively, the method 500 identifies two or more plug-in versions that, when loaded and executed in combination, form the software application to be installed.

At step 510, the method 500 stores data associated with the selected plug-in version in the installation information. At step 512, the method 500 installs the plug-in using the selected plug-in version instead of the compromised plug-in version. In some embodiments, the method 500 executes the installation process with the computed value as a parameter. The method 500 may also store each and every candidate component version locally. At step 516, the method 500 determines whether to install another plug-in. Alternatively, the method 500 determines whether to install another plug-in for the software application. If the method 500 determines that there are more plug-ins or components to be installed, the method 500 returns to step 506. If, on the other hand, the method 500 determines that there are no more components or plug-ins to install, the method 500 proceeds to step 516. At step 516, the method 500 ends.

Figure 6:
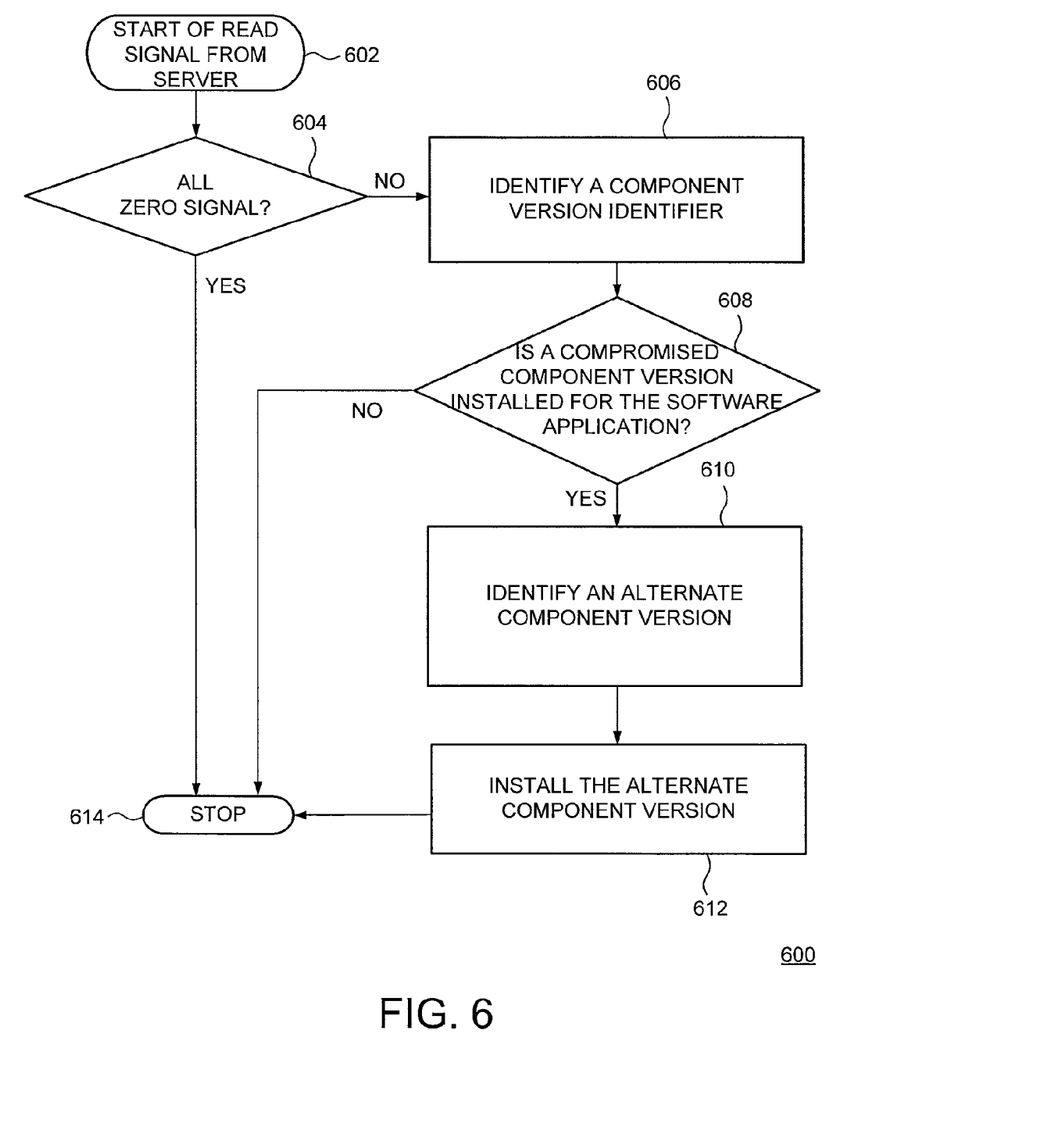
FIG. 6 is a flow diagram of a method for selecting an alternate component version for a compromised component version according to various embodiments.

FIG. 6 is a flow diagram of a method 600 for selecting an alternate component version for a compromised component version according to various embodiments. In some embodiments, installation module (e.g., the installation module 120 of FIG. 1) performs each and every step of the method 600. In other embodiments, some steps are omitted or skipped. The method 600 starts receiving a read signal from a server at step 602 and proceeds to step 604. In addition to indicating a software vulnerability that compromises a specific component version (e.g., plug-in version), the read signal also includes instructions from a server (e.g., the server 102 of FIG. 1) for handling the software vulnerability. For example, the server may instruct the client to select and/or install an alternative component version that provides a same or similar functionality. Accordingly, the read signal forms a portion of server instructions (e.g., the server instructions 212 of FIG. 2).

At step 604, the method 600 determines whether the signal includes only zeros. The method 600 extracts a hexadecimal map from the signal and determines whether the hexadecimal map indicates only zeros (0) values for each index. If the method 600 determines that the signal includes only zeros as values, the method 600 proceeds to step 614. At step 614, the method 600 ends.

If, on the other hand, the method 600 determines that the signal includes non-zero values, the method 600 proceeds to step 606. At step 606, the method 600 identifies a first value denoting a particular component version (e.g., a plug-in version) and a second value denoting a compromised component version. In some embodiments, second value indicates a component of the software application that is vulnerable to attacks. As such, the component is compiled and executed using a different or alternate component version that maintains a same or similar functionality as the compromised component version.

At step 608, the method 600 determines whether the particular software application uses the compromised component version. In other words, the method 600 determines whether the installation of the software application involved the use of the compromised component version. If the software application utilizes plug-ins, the method 600 determines whether a currently installed plug-in corresponds with the compromised component version or another component version associated with the same plug-in.

If the method 600 determines that the compromised component version was used to install the software application, the method 600 proceeds to step 610. At step 610, the method 600 selects the alternate component version that corresponds with the software application. At step 612, the method 600 compiles and executes the alternate component version and installs the software application. At step 614, the method 600 ends.

Optionally, the installation module is always listening to a server at a specific part for exchanging data sending port for information if a software vulnerability exists in one of the installed plug-ins. In some embodiments, the installation module listens for incoming signals for a pre-determined time period (e.g., thirty days) after the product is first launched. The server may send a hexadecimal map containing all zeros if there no software vulnerabilities. If there is a known software vulnerability in component version z of a particular plug-in, the server sends "0000z000" to the client where the installation module will not compile and use z component. If the method 600 software determines that the component version z is installed at the client computer, the method 600 may restore one of the saved plug-ins randomly.

Figure 7:
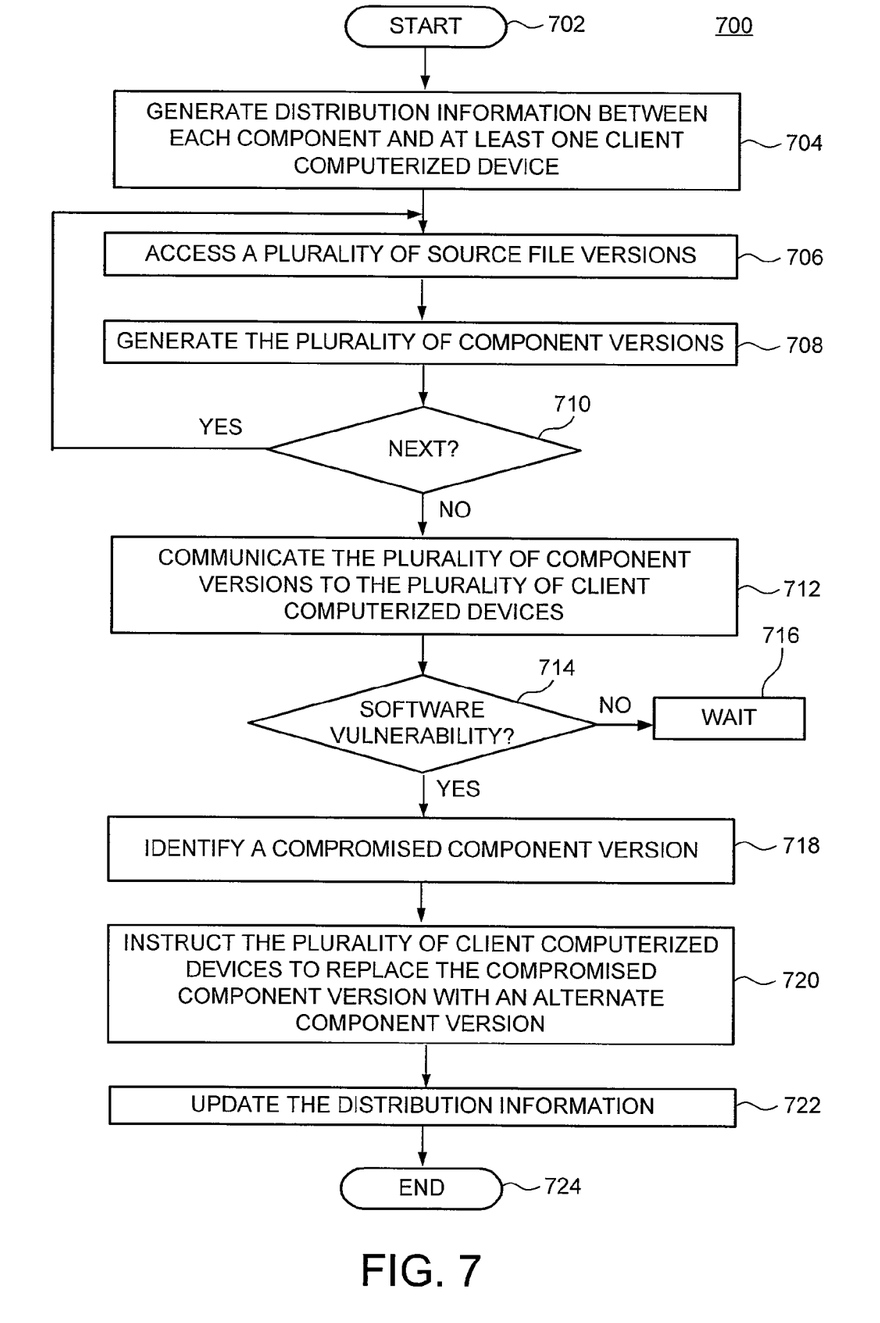
FIG. 7 is a flow diagram of a method for distributing a plurality of component versions to mitigate software vulnerabilities according to various embodiments.

FIG. 7 is a flow diagram of method 700 for distributing a plurality of component versions to mitigate software vulnerabilities according to various embodiments. In some embodiments, a distribution module (e.g., the distribution module 306 of FIG. 3) performs each and every step of the method 700. In other embodiments, some steps are omitted or skipped. The method 700 starts at step 702 and proceeds to step 704.

At step 704, the method 700 generates distribution information between each component of a software application (e.g., the software application 218 of FIG. 2) and at least one client computerized device. The distribution information (e.g., the distribution information 114 of FIGS. 1 and 2) indicates which component version (e.g., one of the component versions 312 of FIG. 3) to install at a particular client computerized device.

In some embodiments, for each component (e.g., the components 118 of FIG. 1, the components 220 of FIG. 2 or the components 314 of FIG. 3), the distribution information maps a specific geographic region (e.g., Europe, China and/or the like) with a particular component version. Hence, client computerized devices located within the specific geographic region only use these component versions to install the components. Other client computerized devices employ alternate component versions to isolate software vulnerabilities to the specific geographic region. The use of alternate component versions at different geographic regions prevents software application malfunction at both regions when one of the component versions becomes compromised.

At step 706, the method 700 accesses a plurality of source file versions (e.g., the plurality of source file versions 112 of FIG. 1). As explained in the present disclosure, each source file version for a particular component provides equivalent functionality but with different programming logic. Hence, vulnerabilities associated with a first source file version do not necessarily exist for a second source file version of a same component. The second source file version may be used instead of the first source file version to mitigate such vulnerabilities. At step 708, the method 700 generates the plurality of component versions. The method 700 compiles the plurality of source file versions to produce executable software code for operating each component of the software application.

At step 710, the method 700 determines whether to generate the plurality of component versions for a next component. If the method 700 determines that another component is to be distributed to the client computerized devices in order to extend or add functionality to the software application, the method 700 returns to step 706. If, on the other hand, the method 700 determines that there are no more components associated with the software application, the method 700 proceeds to step 712. At step 712, the method 700 communicates the plurality of component versions for each component to the plurality of client computerized devices. In some embodiments, the method 700 distributes each and every component version to the plurality of client computerized devices. Alternatively, based on the distribution information, the method 700 communicates only corresponding component versions to each client computerized device.

At step 714, the method 700 waits for detection of a software vulnerability to occur before mitigation. If the method 700 determines that the software application is vulnerable to manipulation or malfunction via a compromised component version, the method 700 proceeds to step 718. Only the client computerized devices that installed the compromised component version are prone to problems associated with a corresponding component. Client computerized devices that did not install the compromised component version are mostly exempt from such problems. The corresponding component should operate correctly on these client computerized devices.

At step 718, the method 700 identifies the compromised component version. At step 720, the method 700 instructs the plurality of client computerized devices to replace the compromised component version with an alternate component version. At step 722, the method 700 updates the distribution information. At step 724, the method 700 ends.

Figure 8:
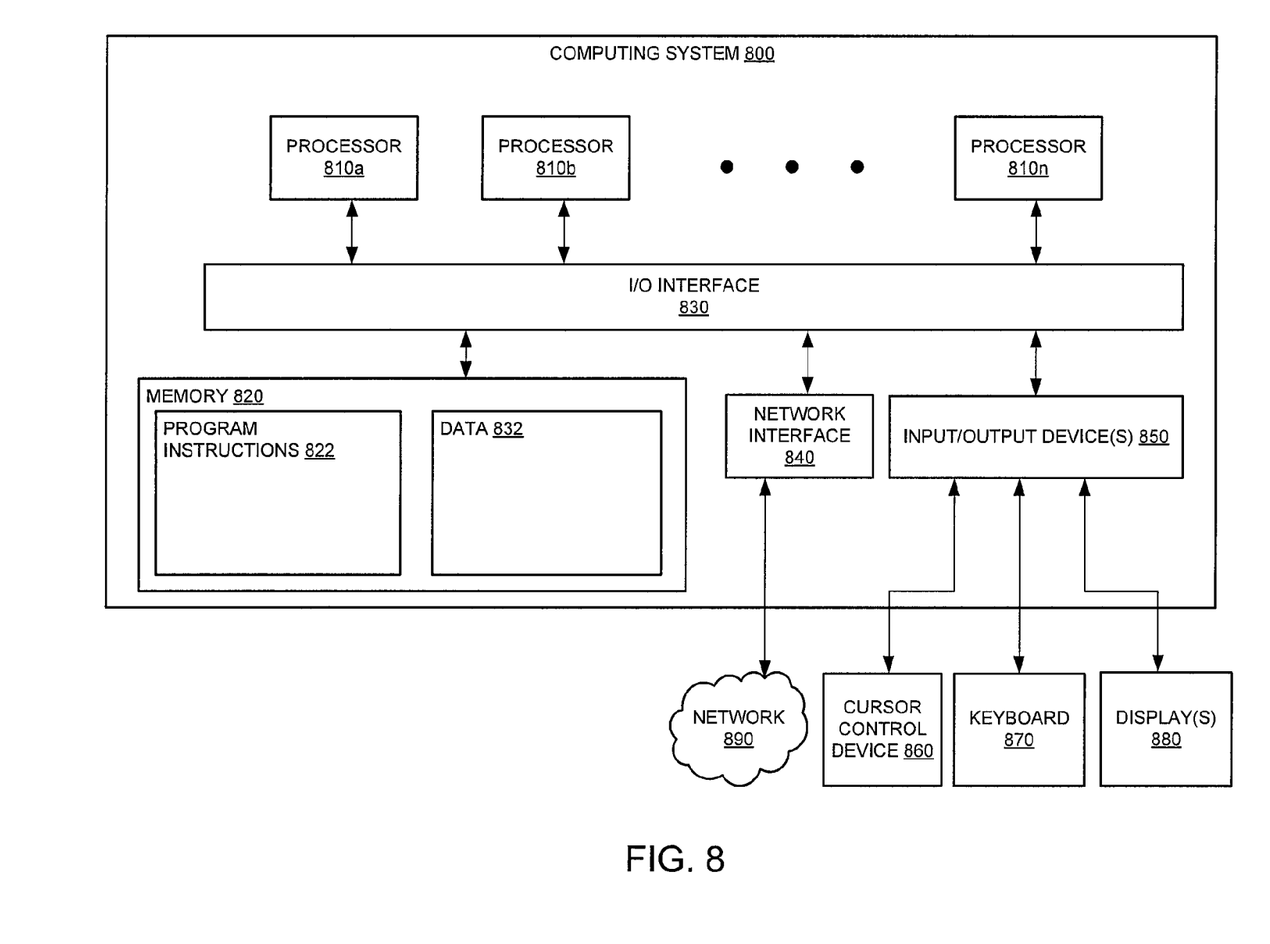
FIG. 8 is a schematic diagram of a computing system that can be used as a computer for mitigating software vulnerabilities according to one or more embodiments.

FIG. 8 is a schematic diagram of an exemplary computer system 800 that can be used as a computer for mitigating software vulnerabilities according to various embodiments.

Example Computer System

Various embodiments of a method and apparatus for mitigating vulnerabilities software, as described herein, may be executed on one or more computer systems, which may interact with various other devices. One such computer system is the client 104 illustrated by FIG. 2, which may in various embodiments implement any of the elements or functionality illustrated in FIGS. 2-5. In various embodiments, computer system 800 may be configured to implement 104 described above. While the illustrated system demonstrates computer system 800 implementing 104, computer system 800 may be used to implement any other system, device, element, functionality or method of the above-described embodiments. In the illustrated embodiments, computer system 800 may be configured to implement the installation module 120 as processor-executable executable program instructions 822 (e.g., program instructions executable by processor(s) 810) in various embodiments.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In various embodiments, any of components 860, 870 or 880 may be utilized by the installation module 120 to receive user input as described above. In various embodiments, a user interface may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 800 may be a uniprocessor system including one processor 810, or a multiprocessor system including several processors $810_n$ (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x98, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 820 or computer system 800.

In one embodiment, I/O interface 850 may be configured to coordinate I/O traffic between processor 810, system memory 820, and any peripheral devices in the device, including network interface 840 or other peripheral interfaces, such as input/output devices 850. In some embodiments, I/O interface 850 may perform any necessary protocol, timing or other data transformations to convert data signals from one components (e.g., system memory 820) into a format suitable for use by another component (e.g., processor 810). In some embodiments, I/O interface 850 may include support for devices attached through various types of peripheral buses, such as a variant of the Peripheral Component Interconnect (PCI) bus standard or the Universal Serial Bus (USB) standard, for example. In some embodiments, the function of I/O interface 850 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system 800 may implement any of the methods described above, such as the methods illustrated by the flowcharts of FIGS. 4-6. In other embodiments, different elements and data may be included.

Those skilled in the art will appreciate that computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Various elements, devices, modules and circuits are described above in associated with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computerized method for mitigating software vulnerabilities in components of a software application, comprising:

receiving, at a client device, a plurality of components for a software application, wherein the plurality of components includes: components that form at least one software application, and one or more additional components for one or more of the components that form the at least one software application;

wherein the one or more additional components are pre-defined alternate component versions which functionally replicate their corresponding component from the one or more components that form the at least one software application but employ different programming logic to prevent vulnerability exploitation;

in response to information identifying at least one compromised component of the components that form the at least one software application, where the compromise comprises a vulnerability, selecting a non-compromised alternate component version for each compromised component from the one or more additional components, wherein the alternate component version restricts functionality problems caused by the vulnerability of the identified compromised component;

replacing, when the at least one software application is currently installed, the each compromised component by loading its corresponding selected non-compromised alternate component version; and installing, when the at least one software application is not currently installed, the at least one software application using the non-compromised alternate component version for the each compromised component.

2. The method of claim 1, wherein selecting the alternate component version further comprises processing instructions for installing the at least one software application.

3. The method of claim 2, wherein the processing instructions identifies the corresponding alternate component versions.

4. The method of claim 1, wherein the at least one software application comprises at least one plug-in.

5. The method of claim 1, wherein the at least one compromised component corresponds with at least one geographic region.

6. The method of claim 1, wherein installing the at least one software application further comprises selecting an alternate component version that corresponds with at least one geographic region.

7. The method of claim 1, wherein installing the at least one corresponding software application further comprises randomly selecting at least one alternate component version to replace the at least one compromised component.

8. The method of claim 1, further comprising providing mappings that associate the alternative component versions with the corresponding components.

9. The method of claim 8, further comprising installing a plurality of alternative component versions using the mappings.

10. A computerized system for mitigating software vulnerabilities in components of a software application, comprising:
   at least one server;
   a non-transitory computer readable storage medium comprising instructions stored thereon that when executed by the at least one server cause the computerized system to:
   generate a plurality of components for a software application, wherein the plurality of components includes: one or more components that form the software application, and one or more alternate components for each of the one or more components that form the software application;
   wherein the one or more alternate components are predefined alternative component which functionally replicate their corresponding component from the one or more components that form the software application but employ different programming logic to prevent vulnerability exploitation;
   in response to information identifying at least one compromised component of the components for the software application, where the compromise comprises a vulnerability, selecting a non-compromised alternate component for each compromised component, wherein the alternate component restricts functionality problems caused by the vulnerability of the identified compromised component; and
   communicating information identifying the at least one compromised component and instructions for installing the non-compromised alternate component for each compromised component.

11. The system of claim 10, wherein the communicated instructions identify the non-compromised alternate components to compile.

12. The system of claim 10, wherein the at least one software application comprises at least one plug-in.

13. The system of claim 10, wherein the at least one compromised component corresponds with at least one geographic region.

14. The system of claim 10, wherein the non-compromised alternate components correspond with at least one geographic region.

15. The system of claim 10, wherein selecting a non-compromised alternate component for each compromised component comprises randomly selecting the non-compromised alternate component to replace each compromised component.

16. The system of claim 10, wherein the at least one server uses mappings to select the non-compromised alternate component for each compromised component.

17. The system of claim 10, wherein the at least one server generates distribution information for installing the at least one software application at a client computerized device.

18. A computerized apparatus for mitigating software vulnerabilities in components of a software application, comprising:
   a computer having one or more processors coupled to a non-transitory memory device, the non-transitory memory device comprising instructions that when executed by the one or more processors cause the computerized apparatus to perform a method comprising:
   receiving, at a client device, a plurality of components for a software application, wherein the plurality of components includes: components that form at least one software application, and one or more additional components for one or more of the components that form the at least one software application;
   wherein the one or more additional components are predefined alternate component versions which functionally replicate their corresponding component from the one or more components that form the at least one software application but employ different programming logic to prevent vulnerability exploitation;
   in response to information identifying at least one compromised component of the components that form the at least one software application, where the compromise comprises a vulnerability, selecting a non-compromised alternate component version for each compromised component from the one or more additional components, wherein the alternate component version restricts functionality problems caused by the vulnerability of the identified compromised component;
   replacing, when the at least one software application is currently installed, the each compromised component by loading its corresponding selected non-compromised alternate component version; and
   installing, when the at least one software application is not currently installed, the at least one software application using the non-compromised alternate component version for the each compromised component.

19. The apparatus of claim 18, wherein the method further comprising receiving server instructions comprising the information identifying the at least one compromised component and a corresponding non-compromised alternate component version.

20. The apparatus of claim 18, wherein the at least one compromised component version corresponds with at least one geographic region.

21. A computerized method of distributing a plurality of component versions to mitigate software vulnerabilities in components of a software application, comprising:
   generating a plurality of components for each component a software application, wherein the plurality of components includes: one or more components that form the software application, and one or more alternate components for each of the one or more components that form the software application;
   wherein the one or more alternate components are predefined alternative components which functionally replicate their corresponding component from the one or more components that form the software application but employ different programming logic to prevent vulnerability exploitation; and communicating the plurality of components for the software application to a plurality of client computerized devices, wherein at least one non-compromised alternate component replaces at least one compromised component on at least one of the plurality of client computerized devices, wherein the at least one compromised component has been identified to include a vulnerability and wherein the alternate component restricts functionality problems caused by the vulnerability of the identified compromised component.

22. The method of claim 21, wherein communicating the plurality of components to a plurality of client computerized devices further comprises communicating the plurality of components to the plurality of client computerized devices using distribution information, wherein the distribution information indicates one of the plurality of components to install at the at least one client computerized device for the each component of the software application.

23. The method of claim 21, wherein communicating the plurality of components further comprises for the each component, communicating a particular one of the plurality of components to the at least one client computerized device.

24. The method of claim 23, wherein the particular component corresponds with a specific geographic region.

25. A computerized system for distributing a plurality of component versions to mitigate software vulnerabilities in components of a software application, comprising:

a plurality of client computerized devices, a distribution module coupled to the plurality of client computerized devices, wherein the distribution module:

generates a plurality of components for each component a software application, wherein the plurality of components includes: one or more components that form the software application, and one or more alternate components for each of the one or more components that form the software application;

wherein the one or more alternate components are predefined alternative component versions which functionally replicate their corresponding component from the one or more components that form the software application but employ different programming logic to prevent vulnerability exploitation;

communicates the plurality of components for the software application to a plurality of client computerized devices using distribution information, wherein at least one non-compromised alternate component replaces at least one compromised component on at least one of the plurality of client computerized devices where the compromise comprises a vulnerability, wherein the at least one non-compromised alternate component restricts functionality problems caused by the vulnerability of the identified compromised component, and wherein the distribution information indicates one of the plurality of components to install at the at least one client computerized device for the each component of the software application.

* * * * *